March 15, 1966  J. C. JUREIT  3,240,869
CABLE PROTECTOR PLATE
Filed Sept. 1, 1964

INVENTOR.
JOHN C. JUREIT
BY *Le Blanc and Shur*

ATTORNEYS.

United States Patent Office 3,240,869
Patented Mar. 15, 1966

3,240,869
CABLE PROTECTOR PLATE
John C. Jureit, Miami, Fla., assignor to Automated Building Components, Inc., Miami, Fla., a corporation of Florida
Filed Sept. 1, 1964, Ser. No. 393,585
2 Claims. (Cl. 174—135)

This invention relates to a protective plate for electrical cables and more particularly to a plate having integral punched-out teeth suitable for use in building construction for bridging lines routed through notched out studs, thus assuring protection against accidental puncturing of electrical cables, plumbing or other service lines.

As is well known, a variety of service lines, including electrical wiring, plumbing, and gas lines as well as the larger airconditioning and heating conduits, pass through the wood framing or supporting structure of a house or building. The cables and conduits usually pass through the wall studding between the walls to suitable outlets providing service to the homeowner or building tenant. A larger number of cables and conduits are necessarily employed in construction in conjunction with the trend to ever-increasing services and more power-operated equipment.

One serious disadvantage in providing a complex network of feed cables and conduits through the walls of a structure lies in the increasing likelihood that the cables will be inadvertently damaged either before or after the building is completely finished. These cables and conduits are most easily run through the framework before the wall or wall covering material is put in place and are quite subject to damage especially by being inadvertently punctured by a nail when the wallboard or wall covering is nailed in place. Very often the carpentry is done by someone other than the electrician or plumber installing the cabling or piping and as a result the carpenter may not be familiar with or remember the exact location of all the conduits and tubing running through the walls once they are wholly or partly covered by paneling. Furthermore, the damage is not likely to be discovered until the cables are completely covered and placed in usage, i.e. until the house is occupied, at which time the cables are not readily accessible through the finished walls and the exact location of the damage may be quite difficult to ascertain without taking out a complete wall or otherwise causing damage requiring extensive and also expensive repairs.

These problems have been recognizd in the past and various attempts have been made to shield the cables and conduits from damage and particularly from inadvertent piercing by a nail either during construction or during subsequent usage by the homeowner as occasioned by the drilling or nailing into the studs for purposes of supporting pictures, fixtures or other wall supported elements. Most likely the homeowner is completely unaware of the exact location of the wiring within the walls of his house and thus it is quite possible that he may by drilling or nailing inadvertently pierce an electrical cable or other conduit if not properly protected.

The prior devices provided to avoid this have not only included heavy cable sheaths, but likewise have included protective plates and other shield devices to be placed over the cables to prevent them from being damaged. However, these plates have been of relatively thin construction provided with either separate or integral rather weak nails which are subject to bending when being driven into the walls and hence themselves constitute a substantial hazard to the conduit. This is especially true since the very plate which is supposed to protect the cable is conventionally hammered into the wooden supporting member at a location closely adjacent the cable or conduit so that a slight bending of the nail or plate teeth during driving may easily result in serious damage to the cable.

In order to overcome the above-mentioned disadvantages the present invention provides a novel protective plate especially for electrical cables but also suited for protecting other conduits passing through a building framework which is of simplified, inexpensive and yet sufficiently rugged construction to adequately protect the cables and which at the same time includes teeth tapered in such a manner as to minimize any likelihood of the protective plate teeth damaging the cable when driven into the wooden support. The protector is preferably in the form of a flat rectangular plate of either plain or galvanized sheet metal having a plurality of integral teeth punched from the plate to extend vertically from one plate surface. An important feature of the present invention lies in the fact that the teeth are provided with a relatively flat tapered point which acts to direct the teeth away from the cable or conduit to be protected. That is the tooth comes to a point along that edge positioned away from the cable so that any tendency for the tooth to bend will result in the flat tapered surface pressing into the wood as the tooth is driven to cause it to move away rather than toward the cable so as to avoid any cable damage. In addition, the teeth are struck from the plate to leave elongated slots having a longitudinal axis substantially parallel to the cables so that the widest and in any event strongest tooth dimension is transverse to the cable; further minimizing the likelihood of the teeth being bent during the hammering or driving operation so as to deflect into the cable thereby damaging it. In addition to protecting the cable the metal plate retains the cable in the desired position and provides additional support for the wooden structure to which it is attached which may have been weakened by the notches provided to pass the cable.

It is therefore one object of the present invention to provide a novel protective plate.

Another object of the present invention is to provide a protective plate particularly suited for use in protecting electrical cables passing through wooden framework.

Another object of the present invention is to provide a protective plate having integral punched-out teeth of increased strength to resist deflection when the plate is hammered or otherwise driven into the wooden support member.

Another object of the present invention is to provide a novel metallic protective plate with integral punched-out teeth having tapered points extending away from the cable to be protected.

These and further objects and advantages of the invention will be more apparent upon reference to the following specification claims and appended drawings wherein:

Figure 1:
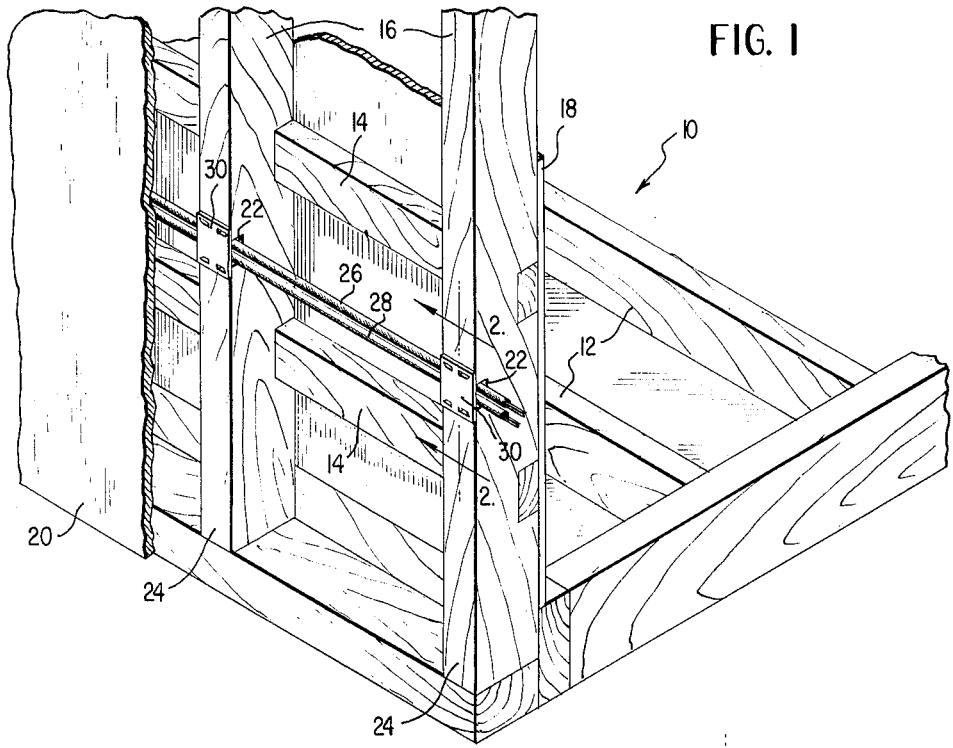
FIG. 1 is a perspective view with parts in section showing a portion of a framework with a pair of electrical cables and protective plates constructed in accordance with the present invention.

Referring to the drawings, there is shown in FIG. 1 a wooden framework generally indicated at 10 comprising a portion of a more or less conventional mobile home or house trailer including floor stringers 12, wall stringers 14, and wall studs 16. The studs are adapted to be covered by an interior wall paneling 18, and exterior wall 20, which walls are conventionally nailed in place to the edges of the studs 16.

Figure 3:
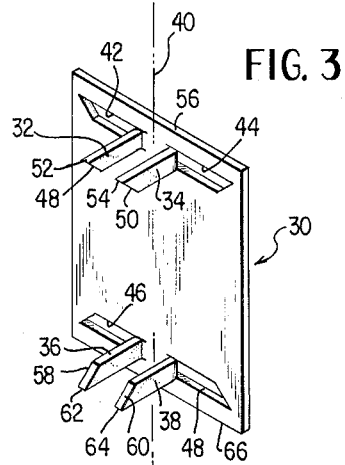
FIG. 3 is an enlaraged view of the protector plate of FIGURES 1 and 2.

Each of the studs 16 is provided with a notch 22 in its outer edge 24, and a pair of cables 26 and 28 are shown as passing through these notches, which cables carry electrical wiring for electric lights, cooking, and other electrical equipment which may be provided in the mobile home. The outer ends of the notches are covered by a pair of protective plates 30, constructed in accordance with the present invention and shown to an enlarged scale in FIGURE 3.

Figure 2:
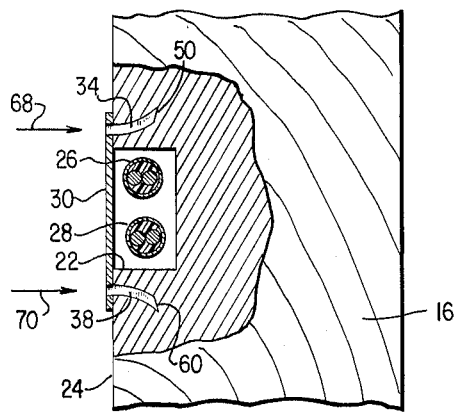
FIG. 2 is a cross-section through the cables and plate taken along line 2—2 in FIG. 1.

As best seen in FIGURE 2, the cables 26 and 28 are of conventional construction comprising a protective outer sheath filled with suitable insulation, the latter surrounding and spacing a pair of conductive wires or electrical leads. The connector 30, comprises a flat rectangular metal plate either plain or galvanized, having punched therefrom a plurality of teeth illustrated as four in number, which teeth are identified at 32, 34, 36 and 38. The teeth are equally spaced on opposite sides of the vertical center line 40 of the plate and leave corresponding elongated slots 42, 44, 46 and 48 extending perpendicular to the center line 40. The teeth are punched out and bent at an angle of 90 degrees to the plate to extend perpendicular from one surface thereof.

Teeth 32 and 34 are provided with flat tapered end surfaces 48 and 50 to define the points 52 and 54 on that edge of each tooth adjacent the upper edge 56 of the plate. Similarly teeth 36 and 38 are provided with flat tapered surfaces 58 and 60 defining points 62 and 64 on that edge of these teeth adjacent the lower edge 66 of the plate 30.

In operation, when the plate is driven into the stud 16 as best seen in FIGURE 2 so that the teeth are driven into the wood in the direction of the arrows 68 and 70, the points of the teeth will cause them to readily enter the wood without any undue bending. However, if there is a tendency for the teeth to bend the flat surfaces such as surfaces 50 and 60 insure that the teeth 34 and 38 and likewise the teeth 32 and 36 of FIGURE 3 will move outwardly away from the cables 26 and 28 due to the reaction force of the wood bearing upon these surfaces. Since the slots 42, 44, 46 and 48 extend parallel to the cables the widest and also the strongest dimension of the teeth which lies parallel to the center line 40 is presented to resist vertical deflection further insuring that the teeth will not deflect into the cables. If desired, the teeth may be provided with a shallow V-shaped cross-section (not shown) to provide additional strength to the teeth.

In the preferred embodiment the teeth have a width, that is, a dimension parallel to the center line 40 on the order of but preferably greater than the thickness of the plate 30, i.e., in the preferred embodiment the tooth width is about three times the plate thickness. While a variety of plates and materials can be employed, a galvanized 16 gauge (standard U.S. gauge) metal plate has been found particularly suited for use as the protective plate 30 of this invention.

It is apparent from the above that the present invention provides a novel protector for building conduits which is not only of substantial strength to adequately protect electrical wiring and the like, but is provided with integral punched-out teeth constructed to insure that the teeth will not deflect into the elecrical cables. The plate is of a relatively simplified inexpensive construction and requires no separate nails since the teeth themselves are of slender nail-like configuration and may be used to securely fasten the plate to the wooden support structure. These teeth are punched out from the plate in the conventional manner to leave elongated slots perpendicular to the vertical center line of the plate. This insures that the strongest dimension of the teeth is presented to resist vertical deflection as the plate teeth are driven into the wood.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A protector for service lines comprising a flat rectangular plate, a pair of teeth struck from said plate adjacent to but spaced from each of two opposite edges thereof, said teeth extending normal to one surface of said plate, the teeth of each pair being equally spaced on opposite sides of a centerline passing through said opposite edges, and leaving slots parallel to said opposite edges and extending from said teeth away from said centerline, each tooth having a substantially uniform cross section throughout the majority of its length and having a slanted substantially flat surface at its end terminating in a tooth tip on that side of the tooth facing the closest one of said opposite edges.

2. A protector according to claim 1 wherein said plate is made of 16-gauge galvanized metal.

References Cited by the Examiner

UNITED STATES PATENTS 2,115,000   4/1938   Abbott _____ 174—48
2,277,758   3/1942   Hawkins.

ROBERT K. SCHAFER, *Primary Examiner.*

DARRELL L. CLAY, JOHN F. BURNS, *Examiners.*

DONALD A. KETTLESTRINGS, *Assistant Examiner.*